United States Patent [19]

Roggenstein et al.

[11] Patent Number: 4,883,603
[45] Date of Patent: Nov. 28, 1989

[54] METHOD FOR SEPARATING COARSE GRAINED AND AGGLOMERATE PIGMENT PARTICLES FROM A SUSPENSION

[75] Inventors: Walter Roggenstein, Freiburg; Paul Rüstemeyer, Gundelfingen, both of Fed. Rep. of Germany

[73] Assignee: Rhodia AG, Breisgau, Fed. Rep. of Germany

[21] Appl. No.: 220,567

[22] Filed: Jul. 18, 1988

[30] Foreign Application Priority Data

Oct. 15, 1987 [DE] Fed. Rep. of Germany ....... 3734881

[51] Int. Cl.$^4$ .............................................. B01D 21/02
[52] U.S. Cl. .................................... 210/802; 210/803; 210/521; 209/2; 209/157; 106/436
[58] Field of Search ............... 210/802, 803, 519, 521, 210/534, 535; 209/157, 158, 172.5, 173.5, 454; 106/436

[56] References Cited

U.S. PATENT DOCUMENTS

| | | | |
|---|---|---|---|
| 1,937,037 | 11/1933 | Hanahan | 106/436 |
| 2,246,030 | 6/1941 | Ancrum et al. | 106/436 |
| 3,886,064 | 5/1975 | Kosonen | 210/519 |
| 3,963,624 | 6/1976 | Henderson et al. | 210/521 |
| 4,089,782 | 5/1978 | Huebner | 210/519 |
| 4,351,733 | 9/1982 | Salzer et al. | 210/802 |
| 4,474,681 | 10/1984 | Belde et al. | 106/436 |
| 4,701,260 | 10/1987 | Lee | 210/802 |

FOREIGN PATENT DOCUMENTS 48815 7/1940 Netherlands .
841640 6/1981 U.S.S.R. .

OTHER PUBLICATIONS

"Umwelt und Technik" Jun. 1984, p. 18.
"Biotechnology and Bioengineering" Jun. 1984, pp. 640-641.

Primary Examiner—Richard V. Fisher
Assistant Examiner—Christopher Upton
Attorney, Agent, or Firm—Bucknam and Archer

[57] ABSTRACT

A method and apparatus for separating coarse grained and agglomerated pigment particles from a suspension containing coarse grained, agglomerated, and fine grained pigment particles by sedimentation by gravity, are described. The suspension, for example of titanium dioxide powder and water, is introduced through an inflow device (3) at the bottom (4) of a vessel (1) from below and flows upwardly through the vessel (1), in which stationary plates (2) are located arranged parallel to each other and at an angle of <90°, preferentially 40° to 60° to the horizontal line. In the upper part (6) of the vessel (1) the suspension which there contains primarily fine grained pigment particles is removed from the vessel (1) through a drain or overflow device (5). In the lower part (4) the suspension containing primarily coarse grained and agglomerated pigment particles is removed from the vessel (1) through an overflow device (7). With the continuous method and with the apparatus according to the invention better separation of coarse grained and agglomerated pigment particles is achieved, compared with the prior art, that is, finer grained pigment particles suitable for the purpose of imparting a mat surface in the chemical fiber industry (man-made fiber industry) obtained.

1 Claim, 2 Drawing Sheets

METHOD FOR SEPARATING COARSE GRAINED AND AGGLOMERATE PIGMENT PARTICLES FROM A SUSPENSION

FIELD OF THE INVENTION

The present invention relates to a method for separating coarse grained and agglomerated pigment particles from a suspension containing coarse grained, agglomerated, and fine grained pigment particles by sedimentation by gravity.

The invention, further, relates to an apparatus for carrying out the method.

BACKGROUND OF THE INVENTION

In the chemical fiber industry (man-made fiber industry) pigments such as titanium dioxide are used primarily for delustering threads (filaments). For this application it is important that the pigment particles be fine grained, because

- coarse grained and agglomerated pigment particles can settle in the spinning nozzle fittings during spinning of the threads, a fact which leads to an undesirable pressure rise in the spinning apparatus with the result among others that the spinning nozzle must be changed;
- coarse grained and agglomerated pigment particles lead to a shift of the reflection maximum to higher wavelengths and, consequently, to yellowish color;
- coarse grained and agglomerated pigment particles due to a decrease in the light diffusion lead to graying; and
- coarse grained and agglomerated pigment particles can have a strength-diminishing effect on the filaments.

The powdered pigment shipments supplied by the pigment industry to the chemical fiber industry (man-made fiber industry), however, due to the manufacturing processes consist of a mixture of coarse and fine pigment particles. Further, in the chemical fiber industry (man-made fiber industry) pigments are added before spinning to the starting materials of the threads, such as polymers, in the form of a suspension. In such a suspension, however, the fine pigment particles, primary particles, may agglomerate to form relatively large coarse secondary particles.

A suspension of a pigment shipment supplied by the pigment industry contains, therefore, coarse, agglomerated, and fine pigment particles. In view of the fact that for dulling threads as mentioned hereinbelow, only fine pigment particles can be used, the coarse and agglomerated pigment particles must be separated from the suspension.

According to prior art known within the trade but not documented by publications, coarse grained and agglomerated pigment particles are separated from a suspension containing coarse grained, agglomerated and fine grained pigment particles by sedimentation by gravity as follows: An aqueous suspension of coarse grained, agglomerated, and fine grained pigment particles, titanium dioxide particles, is introduced into a cylindrical sedimentation container having a height of 860 mm. and a diameter of 895 mm. through an inlet at the top of the container. This container consists of a cylindrical case, with a cover having an inlet opening for the pigment suspension and a bottom provided with an outlet opening for removing the suspension containing the coarse grained and agglomerated pigment particles and an outlet for carrying away the suspension containing the fine grained pigment particles. The latter outlet consists of a short nozzle either inner threads, the nozzle in its upper region, the nozzle projecting approximately 50 mm into the container, and a pipe which can be screwed into the nozzle, with which the short pipe is closed. The suspension is allowed to stand for approximately 24 hours so that the coarse grained and agglomerated pigment particles can settle into the lower region of the container, and specifically below the upper edge of the nozzle. Subsequently, the pipe which projects through the cover of the container and, consequently, can be manipulated from the exterior, is screwed out of the short nozzle, so that the suspension containing primarily fine grained pigment particles can flow out of the container downward through the short nozzle. In the lower part of the container, below the edge of the short pipe, remains the suspension containing primarily coarse grained and agglomerated pigment particles. After six batches the container is cleaned by rinsing with water.

The drawbacks of this process and the known apparatus, however, are that

- due to the predetermined settling time of 24 hours, only the coarse grained and agglomerated pigment particles with a relatively large particle diameter, for example of approximately $\geq 2.5$ μm can be completely separated;
- due to the rinsing step a large quantity of waste consisting of water and pigment particles accumulates; and
- the method can only be carried out discontinuously.

SUMMARY OF THE INVENTION

An object of the present invention is to provide a method of the type discussed hereinabove for separating coarse grained and agglomerated pigment particles from a suspension containing coarse grained, agglomerated, and fine grained pigment particles

- with which, compared to the known method, given the same throughput quantity coarse grained and agglomerated pigment particles having a smaller particle of diameter, for example approximately $\geq 1.0$ μm can be separated out to 100%;
- with which no rinsing is necessary; and
- which can be carried out continuously.

This object is solved by a method with the features defined in claim 1. Advantageous embodiments of the method according to the invention are recited in claims 2 and 3.

An object of the invention is also to provide an apparatus for carrying out the method according to the invention. This object is solved according to the invention by an apparatus with the features defined in claim 4. Advantageous embodiments of the apparatus according to the invention are defined in claims 5 and 6.

The invention has the following advantages:

- at the same throughput as the known method, the invention permits separation of coarse grained and agglomerated pigment particles having smaller particle diameters, whereby pigments with very fine grain are obtained;

The use of so-called baffle plate clarifiers or baffle plate separators is known for separating mud from untreated water such as surface water or cooling water, thus for obtaining purified water; see *Umwelt und Technik* 1984, 7 (June), p. 18, as well as the Lamellar Cross Flow Settler for separating microbial cells, described in *Biotechnology and Bioengineering* 1984, 26 (6), pp. 640-641, but is not known in the completely different technical field of chemical fiber industry (man-made fiber industry) for separating coarse grained and agglomerated pigment particles from a suspension containing coarse grained, agglomerated, and fine grained pigment particles, i.e. for obtaining fine grained pigment particles to be used for delustering purposes.

BRIEF DESCRIPTION OF THE DRAWINGS

The invention is explained hereinbelow with reference to the drawings of which:

As shown in FIG. 1, numeral 1 is a rectangular vessel in which stationary plates 2 are located arranged parallel to each other and at an angle of approximately 50° to the horizontal line. The lower part 4 of vessel 1 is funnel-shaped. Vessel 1 has an inlet device 3, which empties into the lower part 4 of this vessel 1, for introducing the suspension containing coarse grained, agglomerated, and fine grained pigment particles into vessel 1. Vessel 1, further, has a drain or overflow device 5 in the upper part 6 of vessel 1 for removing the suspension containing primarily fine grained pigment particles from vessel 1. In the upper part 6 of vessel 1, in addition, a plate 9 is provided, with which the space of vessel 1, which is free of plates 2, is covered or closed at the top. This plate 9 functions to prevent a short-circuit flow of the suspension from the lower part 4 of vessel 1 and, consequently, the suspension containing primarily fine grained pigment particles, which forms at the upper side of plates 2, is guided over this plate 9 to the drain or overflow device 5.

Finally, the lower part 4 of vessel 1 is additionally provided with an outflow device 7 for carrying the suspension containing primarily coarse grained and agglomerated pigment particles out from vessel 1.

Figure 1:
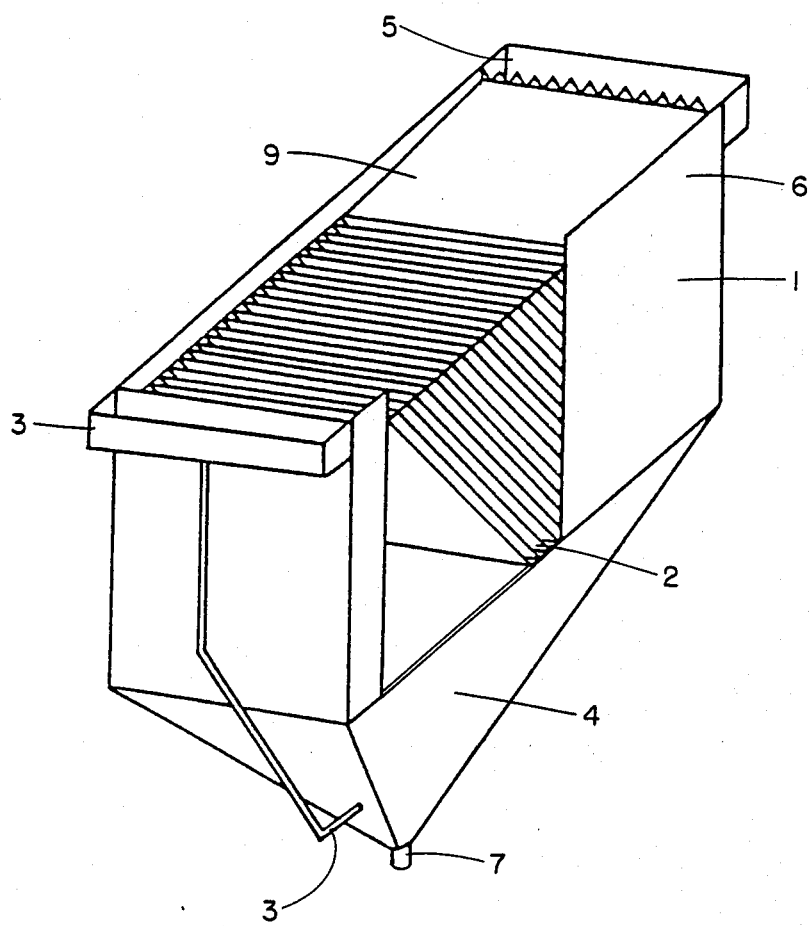
FIG. 1 is a perspective view of an apparatus according to the invention; for better representation of the parallel plates arranged obliquely a side wall of the vessel is only partially drawn in this figure.
Figure 2:
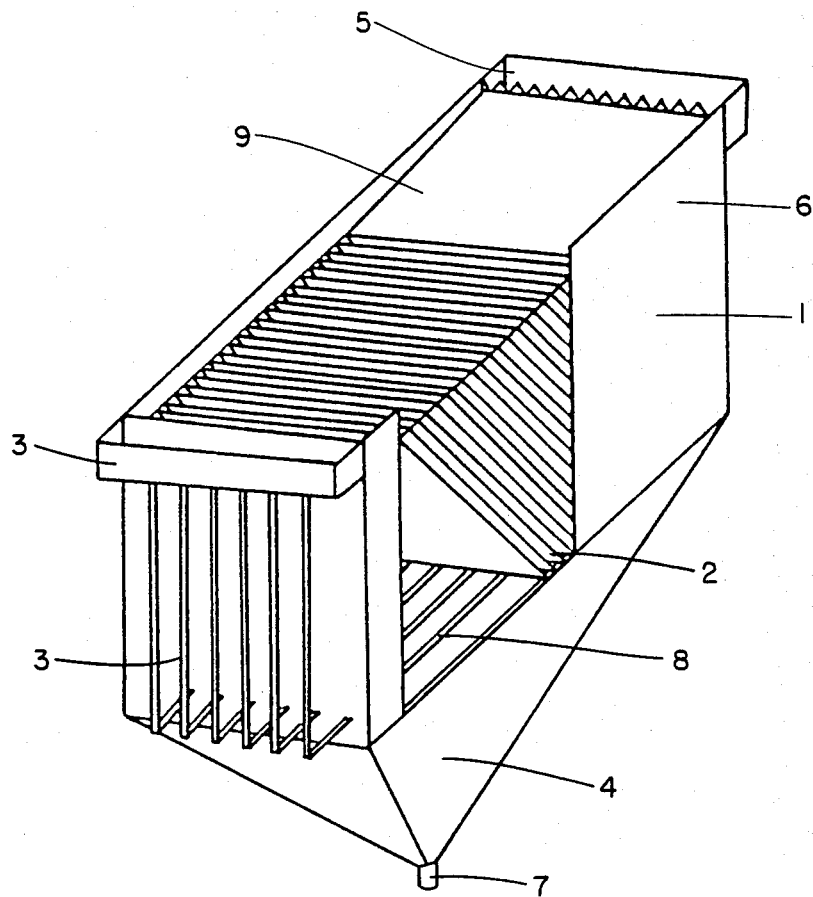
FIG. 2 is a perspective view of an apparatus according to the invention, in which the inflow device is connected to distributor pipes, which extend substantially horizontally within the vessel and in its lower part and which are provided with bores for introducing the suspension containing coarse grained, agglomerated, and fine grained pigment particles into the vessel (see claim 6); in this figure a side wall of the vessel is also only partially drawn to better represent the plates and the distributor pipes.

FIG. 2 shows an apparatus as shown in FIG. 1, but with the difference that the inlet device 3 is connected with distributor pipes 8, which extend essentially horizontally within vessel 1 and in its lower part 4 and, as shown in the figure, essentially parallel to each other. The distributor pipes 8 are provided with bores for introducing the suspension containing the coarse grained, agglomerated, and fine grained pigment particles into vessel 1. With the apparatus according to the invention shown in FIG. 1, coarse grained and agglomerated titanium dioxide particles have been separated from an aqueous suspension containing coarse grained, agglomerated, and fine grained titanium dioxide particles. For this purpose, the apparatus according to the invention was built as follows: the vessel 1 was made of high-quality sheet steel and had the following inner dimensions: height 1000 mm, length also 1000 mm, and width 400 mm. The plates 2 located in the vessel 1 were also of high-quality sheet steel and were stationary, arranged parallel to each other, and inclined at an angle of 50° to the horizontal line. Plates 2 had each a length of 500 mm, a width of 400 mm, and in each instance a perpendicular distance from each other of 11.5 mm. A suspension was prepared from the titanium dioxide powder of type LW-S, modification Anatas, marketed by the company Sachtleben, Duisburg, Federal Republic of Germany, and desalted water with a dispersing device. The density of the titanium dioxide was 3,900 kg/m$^3$ and density of the water was 1,000 kg/m$^3$. The conductivity, that is, the electrical conductance of the water was 0.25 $\mu$s. The concentration of the suspension was approximately 22 percent by mass (percent by weight) and 6 percent by volume. The suspension was continuously introduced into vessel 1 through the inlet device 3 and guided from below upwardly between plates 2 through this vessel 1. After the vessel 1 was filled with the suspension, a part of the suspension was carried from vessel 1 through overflow device 7 and the other part of the suspension through overflow device 5. Regulation of the quantity of the suspension which was carried from vessel 1 through the overflow device 5 took place through the amounts of suspension, which were introduced through inlet device 3 into vessel 1 and which were carried off through outlet device 7 from vessel 1. The quantity of suspension carried from vessel 1 through the overflow device 5 was 0.4 m$^3$/24 hours. After 12 hours a stationary state was reached, that is through the overflow device 5 a suspension containing primarily fine grained pigment particles was removed from vessel 1; and through the outflow device 7 a suspension containing primarily coarse grained and agglomerated pigment particles was removed from vessel 1.

For the purpose of evaluating the suspension removed from vessel 1 through the overflow device 5 containing primarily fine grained pigment particles a filtration test was carried out. This filtration test was carried out according to the hand filter plate experiment generally customary in filtration technology: the suspension was sucked with a vacuum source through a metal tissue filter with a mesh size of 5 $\mu$m and an area of 20 cm$^2$. The quantity of solid matter in the filtrate, which was obtained before the metal tissue filter was completely clogged up, which was 7,000 g, was used as measure of the degree of fineness of the pigment particles present in the suspension.

For comparison, the previously described filtration test was also carried out with a suspension containing primarily fine grained pigment particles, which were obtained according to the method in accordance with prior art mentioned in the introductory part of this specification. For this comparative experiment, the starting suspension was the same and the throughput quantity of the obtained suspension was the same, specifically 0.4 m$^3$/24 hours. After carrying out the filtration test, a solid matter quantity of only 400 g was measured in the filtrate. The comparison of the measured values, specifically 7,000 g and 400 g show that with the method and apparatus according to the invention compared to the known method, a significantly better separation of the coarse grained and agglomerated pigment particles is achieved.

What is claimed is:

1. A method of separating coarse grained and agglomerated pigment particles from a suspension containing coarse grained, agglomerated and fine grained particles by sedimentation by gravity and removing a suspension containing primarily fine grained pigment particles which consists of introducing said suspension into an apparatus comprising a vessel (1), said vessel having an inflow device (3) for introducing said suspension into the vessel, the vessel being funnel shaped at the bottom (4), said inflow device leading into said funnel shaped bottom, a plurality of stationery angled plates (2) within the vessel disposed parallel to each other and at an angle of <90° from the horizontal, said inflow device being located below said angled plates, an upper drain or overflow device (5) in the upper part of said vessel for discharging a suspension containing mainly finely grained pigment particles from the vessel, a lower drain (7) in the lower part of the vessel for discharging the suspension containing mainly coarse grained and agglomerated pigment particles from the vessel, a horizontal plate (9) in the upper part (6) of said vessel (1) covering the area of the upper part of the vessel (1) which is free of said angled plates (2), the horizontal plate (9) being located between the angled plate (2) which is the closest to said upper drain or overflow device (5) and said overflow device (5), said upper drain or overflow device being located on the same level as said horizontal plate (9), whereby short-circuit flow of the suspension from the lower part (4) of the vessel (1) is avoided, transferring a suspension containing primarily fine grained pigment particles to the upper drain or overflow device (5) and discharging said suspension containing primarily fine grained pigment particles therefrom.

* * * * *